US009483150B2

(12) United States Patent
Chung

(10) Patent No.: US 9,483,150 B2
(45) Date of Patent: Nov. 1, 2016

(54) TOUCH SENSOR MECHANISM AND MANUFACTURING METHOD THEREOF

(71) Applicant: TERA XTAL TECHNOLOGY CORPORATION, Hsinchu (TW)

(72) Inventor: Jun-Wen Chung, Hsinchu (TW)

(73) Assignee: TERA XTAL TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/661,006

(22) Filed: Mar. 18, 2015

(65) Prior Publication Data

US 2015/0193054 A1 Jul. 9, 2015

Related U.S. Application Data

(63) Continuation-in-part of application No. 13/794,655, filed on Mar. 11, 2013, now Pat. No. 9,013,446.

(51) Int. Cl.
*G06F 3/044* (2006.01)
*G02F 1/1333* (2006.01)

(52) U.S. Cl.
CPC .......... *G06F 3/044* (2013.01); *G02F 1/13338* (2013.01); *G02F 2001/133331* (2013.01); *G06F 2203/04103* (2013.01); *G06F 2203/04111* (2013.01); *Y10T 29/49002* (2015.01)

(58) Field of Classification Search
CPC .................... G06F 3/044; G06F 2203/04103; G06F 2203/04111; G02F 1/13338; G02F 2001/133331
See application file for complete search history.

(56) References Cited

U.S. PATENT DOCUMENTS

| | | | | |
|---|---|---|---|---|
| 8,144,132 B2 * | 3/2012 | Chen | G06F 3/044 345/174 |
| 8,947,373 B2 * | 2/2015 | Kremin | G06F 3/0418 345/173 |
| 2006/0102463 A1 * | 5/2006 | Cok | G06F 3/045 200/512 |
| 2013/0135241 A1 * | 5/2013 | Wu | G06F 3/041 345/173 |

* cited by examiner

*Primary Examiner* — Abbas Abdulselam
(74) *Attorney, Agent, or Firm* — Mark M. Friedman

(57) ABSTRACT

A touch sensor mechanism for a touch display device, includes a cover lens made by a transparent material having a dielectric constant greater than 4.5 and a compression strength greater than 700 MPa for generating a finger's touching capacitance ($C_F$) while a user's finger of a user touch thereon; and a sensor device module including a plurality of sensor devices having a sensor parasitic capacitance ($C_P$). The cover lens and the sensor device module are disposed in the touch display device in such a manner that a ratio of a standard deviation value ($\sigma_U$) of the finger's touching capacitance ($C_F$) of the cover lens to the sensor parasitic capacitance ($C_P$) of the sensor device module is a signal-to-noise ratio (SNR). The SNR is adjusted along with the finger's touching capacitance ($C_F$) by reducing the thickness of the cover lens.

18 Claims, 22 Drawing Sheets

1

2

3

931 performing the OLED display device processes 932 attaching the OLED display device to a cover glass having the sensor device module

FIG. 14

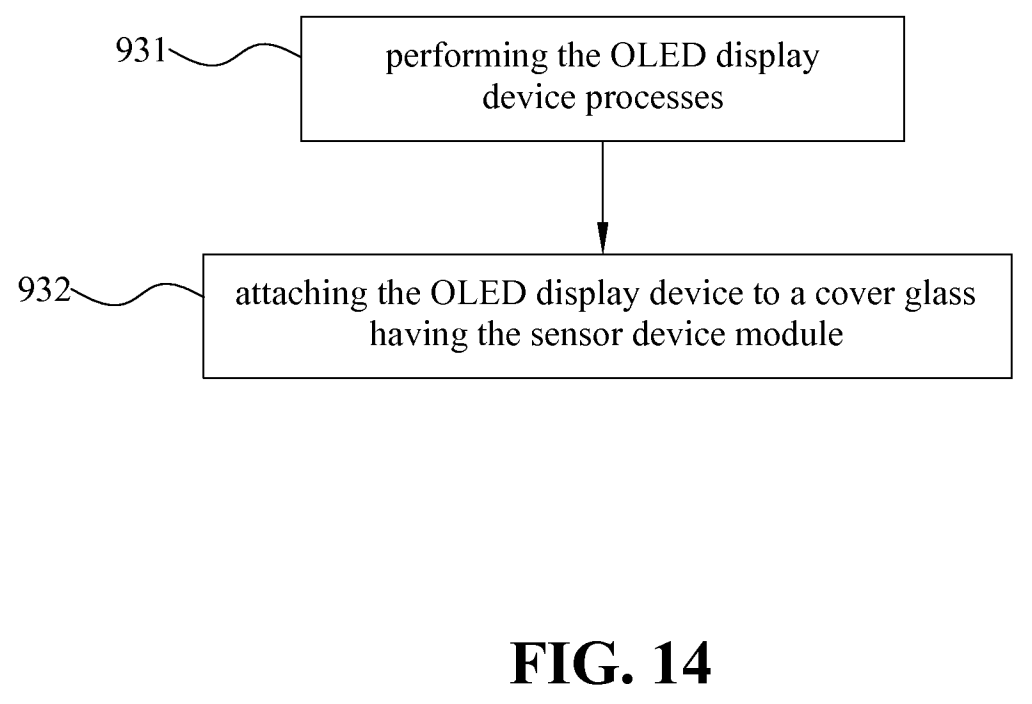

TOUCH SENSOR MECHANISM AND MANUFACTURING METHOD THEREOF

CROSS-REFERENCES TO RELATED APPLICATIONS

This is a continuation-in-part of U.S. application Ser. No. 13/794,655, filed on Mar. 11, 2013, which is incorporated herewith by reference.

BACKGROUND OF THE INVENTION

1. Field of the Invention

The present invention generally relates to a touch sensor mechanism and the manufacturing method thereof, more specifically to a touch sensor mechanism and the manufacturing method thereof applied in a touch display device, in which, a transparent material with higher dielectric constant and mechanic strength is implemented as a cover lens for touching thereon. The thickness of the cover lens can be reduced in order to enhance the signal-to-noise ratio (SNR).

2. The Prior Arts

Well-known technology of capacitive touch device using touch sensors already applied in touch electronic devices/products for years. In general, a solution in transitional capacitive touch sensors is using a cover lens with thickness less than 3 mm. In the other words, the touch signal sensing is difficult or distorted due to the thick glass and it will result the judgment mistakes of the touch electronic devices/products. Therefore, reducing the thickness of cover lens is necessary, however, reducing the thickness of cover lens also reduce the mechanic strength of the touch electronic devices/products.

In general, capacitance is calculated by the formula $C=(\epsilon_r\epsilon_0*A)/d$, wherein $\epsilon_r$ is dielectric constant, $\epsilon_0$ is free space permittivity, A is area of finger and sensor pad overlap, and d is distance between conducting materials. Therefore, the higher of dielectric constant of the cover lens, the higher of finger's touching capacitance $C_F$. As the calculation of formula, the lower of the thickness of the cover lens, the higher of finger's touching capacitance $C_F$; and the lower of thickness, the higher mechanic strength of material is requested. In the view point of crosstalk noise from a sensor device to another sensor device, the lower thickness is better for reducing the transmitting distance, the higher dielectric constant of cover lens, the longer distance between the sensor devices, and the lower current of driving circuit are better for preventing the interaction from the electromagnetic field.

In the touch display device, the signal-to-noise ratio (SNR) is measured according to the count value at the output terminal of sensors. For example, when the finger does not touch the sensors, the unpressed average value is $\mu_U$, and unpressed standard deviation value is $\sigma_U$; when the finger touches the sensors, the pressed average value is $\mu_P$, and pressed standard deviation value is $\sigma_P$, in general, the signal-to-noise ratio (SNR) is $(\mu_U-\mu_P)/\sigma_U$. According to the touch sensing theory, $C_{Total}=C_F+C_P$, wherein, $C_{Total}$ is the total capacitance and $C_P$ is a sensor parasitic capacitance which is the capacitance of sensor device itself, and $C_F$ is capacitance generated by the finger touching, also called finger's touching capacitance. Signal-to-noise ratio (SNR) is related to the ratio of $(C_{Total}-C_P)/C_P$, that is $(C_F/C_P)$, and signal-to-noise ratio (SNR) is better in a suitable value, such that the sensitivity will not too high or too low. Therefore, the higher tolerance of crosstalk noise is requested in design specification, the finger's touching capacitance $C_F$ related to signal-to-noise ratio (SNR) should be higher.

Recently, because Apple Inc. uses projection-typed capacitive touch device in their products, such that projection-typed capacitive touch device becomes popular due to advantages of simple structure, high reliability, long lifetime, acceptable sensitivity, acceptable precision, acceptable light transmittance, and multi-touch implement.

However, this touch sensor technology is not perfect, for example, the capacitance of this touch sensor technology is easily influenced by the electromagnetic field effect of circuit so at to the effective size of touch panel used this technology is limited to a mid-small size which is equal to or smaller than 17 inches. Larger size (17~30 inches) of the touch panel used this technology is only in the experiment or test steps, and commercialized, and the companies are developing and improving for increasing the apply range of projection-typed capacitive touch technology.

Furthermore, the touch sensor technology is developing from one glass solution/touch on lens (OGS/TOL) to on-cell, on-cell/in-cell hybrid and in-cell, and it will increase the distance between sensor and cover lens, and would cause the assembly/attaching gap such that the finger's touching capacitance $C_F$ is decreased and the touch sensitivity is reduced. Moreover, the larger size and the higher density of sensor will cause the much serious influence by the electromagnetic effect.

Therefore, it is requested to develop a touch sensor technology applied in a touch display device, which can eliminate the problems such as reducing the thickness of the cover lens (for example, the thickness lower than 1 mm) without affecting the mechanic strength of touch electronic devices/products due to the higher mechanic strength (for example, the compressive strength higher than 700 MPa) of cover lens; and reducing the thickness of the cover lens which can increase the finger's touching capacitance $C_F$ and the signal-to-noise ratio (SNR) related to the ratio $C_F/C_P$ for real application in order to eliminate the problem of reducing touch sensitivity by using the cover lens with higher dielectric constant (for example, the dielectric constant higher than 4.5), such that the tolerance of noise caused by crosstalk can be improved by increasing the finger's touching capacitance $C_F$ and serious electromagnetic affect due to the large-sized of touch panel of touch display device can be also eliminated.

SUMMARY OF THE INVENTION

An objective of the present invention is to provide a touch sensor mechanism and the manufacturing method thereof applied in a touch display device, which uses a transparent material with high higher (>4.5) dielectric constant and high (>700 MPa) mechanic strength as a cover lens which can reduce the thickness. The higher dielectric constant, finger's touching capacitance ($C_F$) which the signal-to-noise ratio (SNR) can be adjusted to a suitable value to prevent the sensitivity too high or too low, and the problem of sensitivity could be solved.

Another objective of the present invention is to provide a touch sensor mechanism and the manufacturing method thereof applied in a touch display device. Since the finger's touching capacitance ($C_F$) can be greatly improved, so that the signal-to-noise ratio (SNR) is also improved. The tolerance of noise caused by crosstalk between sensor to sensor could be increased and serious electromagnetic interaction due to the large-sized of touch panel of touch display device can be also solved, and/or it provides more tolerance in circuit design.

According the objectives above, the touch sensor mechanism of the present invention includes a cover lens and a sensor device module, and the touch sensor mechanism is applied in a touch display device, such as out-cell LCD touch display device, in-cell LCD touch display device, on-cell LCD touch display device, in-cell/on-cell hybrid LCD touch display device, out-cell OLED touch display device, on-cell OLED touch display device, in-cell OLED touch display device, capacitive fingerprint recognition, capacitive palm print recognition, and handwriting trackpad. The OLED touch display device (e.g. out-cell OLED touch display device, on-cell OLED touch display device, and in-cell OLED touch display device) includes an OLED module. The OLED module includes a transparent conductive film. The material of the transparent conductive film is 2D material, transparent conductive oxide or conductive polymer. The 2D material is selected from a group consisting of graphene, silver nanowires, carbon nanotube, tungsten diselenide, molybdenum disulfide, and metal oxides. The transparent conductive oxide is selected from a group consisting of Al-doped ZnO, Ga-doped ZnO, In-doped ZnO, and Mg-doped ZnO. The conductive polymer is selected from a group consisting of polythiophene, polypyrrole, polyaniline, polyacetylene, polyphenylene, and poly(phenylene vinylene).

Regarding the cover lens, the cover lens is a transparent material with a high dielectric constant (>4.5) and high mechanic strength (>700 MPa) for touch. The finger's touching capacitance ($C_F$) is greatly improved by reducing the thickness and increasing dielectric constant, such that the signal-to-noise ratio (SNR) can also be improved. The signal-to-noise ratio (SNR) can be adjusted to a suitable value to prevent the sensitivity too high or too low, and the tolerance of crosstalk noise between sensor to sensor can be improved and serious electromagnetic affect due to the large-sized of touch panel of touch display device can be also eliminated, and/or it provides more tolerance in circuit design.

Herein, sapphire ($Al_2O_3$) in varied axis (such as a-axis, c-axis, m-axis, and r-axis) is selected as the material of cover lens. The compression strength in each axis of sapphire is higher than 2000 MPa, and the dielectric constant ($\in_r$) is 11.5 in a-axis, 9.3 in c-axis and 11.5 in m-axis. Since sapphire in varied axis can be applied, and sapphire can be a single crystal in one of a-axis, c-axis, m-axis, and r-axis, wherein the crystal direction in c-axis is (0001); crystal direction in a-axis includes $(1\bar{2}10)$, $(11\bar{2}0)$, $(2\bar{1}\bar{1}0)$, $(\bar{1}\bar{1}20)$, $(\bar{2}110)$ and $(\bar{1}2\bar{1}0)$; crystal direction in m-axis includes $(\bar{1}010)$, $(\bar{1}100)$, $(01\bar{1}0)$, $(10\bar{1}0)$, $(\bar{1}100)$, and $(0\bar{1}10)$; and crystal direction in r-axis includes $(10\bar{1}1)$, $(\bar{1}01\bar{1})$, $(01\bar{1}\bar{1})$, $(0\bar{1}11)$, $(1\bar{1}0\bar{1})$ and $(\bar{1}101)$. The material of cover lens may also be an aluminum oxynitride glass ($Al_{(64|x)/3}O_{(32-x)}N_x$, 2.75≤×≤5) with compression strength higher than 2677 MPa and the dielectric constant ($\in_r$) 9.19. The material is selected according to the real condition. The material of cover lens may also be a spinel or other transparent ceramic materials.

In the touch display device, the signal-to-noise ratio (SNR) is measured according to the count value at the output terminal of sensors. For example, when the finger does not touch the sensors, the unpressed average value is nu, and unpressed standard deviation value is $\sigma_U$; when the finger touches the sensor, the pressed average value is $\mu_P$, and pressed standard deviation value is $\sigma_P$, in general, the signal-to-noise ratio (SNR) is $(\mu U-\mu P)/\sigma_U$.

Reducing the thickness of cover lens and increasing the dielectric constant of cover lens, the finger's touching capacitance ($C_F$) can be greatly increased to increase the ratio of $(C_{Total}-C_P)/C_P$, that is $(C_F/C_P)$, such that the signal-to-noise ratio (SNR) can be adjusted to satisfy the real-applied request, wherein $C_{Total}=C_F+C_P$, $C_F$ is finger's touching capacitance, and $C_P$ is the sensor parasitic capacitance of sensor device. Take well-known out-cell touch device which has a cover lens with a thickness of 0.7 mm and a dielectric constant 4.5 as an example, if the cover lens is changed by a c-axis sapphire glass, the thickness could be reduced to 0.245 mm under touch in same compression strength, and the finger's touching capacitance $C_F$ becomes 5.9 times, and if the cover lens is changed by a a-axis or m-axis sapphire glass, the thickness could be reduced to 0.245 mm under touch in same compression strength, and the finger's touching capacitance $C_F$ becomes 7.3 times, moreover, if the cover lens is changed by an aluminum oxynitride glass, the thickness could be reduced to 0.183 mm under touch in same compression strength, and the finger's touching capacitance $C_F$ becomes 7.81 times.

Regarding the sensor device module, the sensor device module has at least two sensor devices. In the view point of tolerance of crosstalk noise of sensor to sensor between any two sensor devices, the lower thickness is better for reducing the transmitting distance, the higher dielectric constant of cover lens, the longer distance between sensor devices, and the lower current of driving circuit are better for preventing the interaction from the electromagnetic affect.

Moreover, the sensor device module at least includes a first electrode layer of y-axis circuit net, an insulated layer and a second electrode layer of an x-axis circuit net in some embodiments, wherein the first electrode layer is a sensing circuit, and the second electrode layer is a driving circuit, wherein each of the first electrode layer and the second electrode layer includes a transparent conductive film. The material of the transparent conductive film is 2D material, transparent conductive oxide or conductive polymer. The 2D material is selected from a group consisting of graphene, silver nanowires, carbon nanotube, tungsten diselenide, molybdenum disulfide, and metal oxides. The transparent conductive oxide is selected from a group consisting of Al-doped ZnO, Ga-doped ZnO, In-doped ZnO, and Mg-doped ZnO. The conductive polymer is selected from a group consisting of polythiophene, polypyrrole, polyaniline, polyacetylene, polyphenylene, and poly(phenylene vinylene). It is only one implement type, the function of x-axis and y-axis circuit nets can be exchanged. In the other embodiments, sensor device module is combined with the liquid crystal module and disposed in the liquid crystal module to form an in-cell type. The implement types are selected to satisfy the real application.

During the processes of the manufacturing method of the touch sensor mechanism, preparing a touch display device having the sensor device module firstly, and covering a cover lens of the touch sensor mechanism on the top of the touch display device after finishing the processes for manufacturing the touch display device The accompanying drawings are included to provide a further understanding of the invention, and are incorporated in and constitute a part of this specification. The drawings illustrate embodiments of the invention and, together with the description, serve to explain the principles of the invention.

BRIEF DESCRIPTION OF THE DRAWINGS

The present invention can be understood in more detail by reading the subsequent detailed description in conjunction with the examples and references made to the accompanying drawings, wherein:

FIG. 14 is a flow chart illustrating the detail steps of forming the sensor device module of the manufacturing method the touch sensor mechanism shown in FIG. 12;

DETAILED DESCRIPTION OF THE PREFERRED EMBODIMENT

Figure 1:
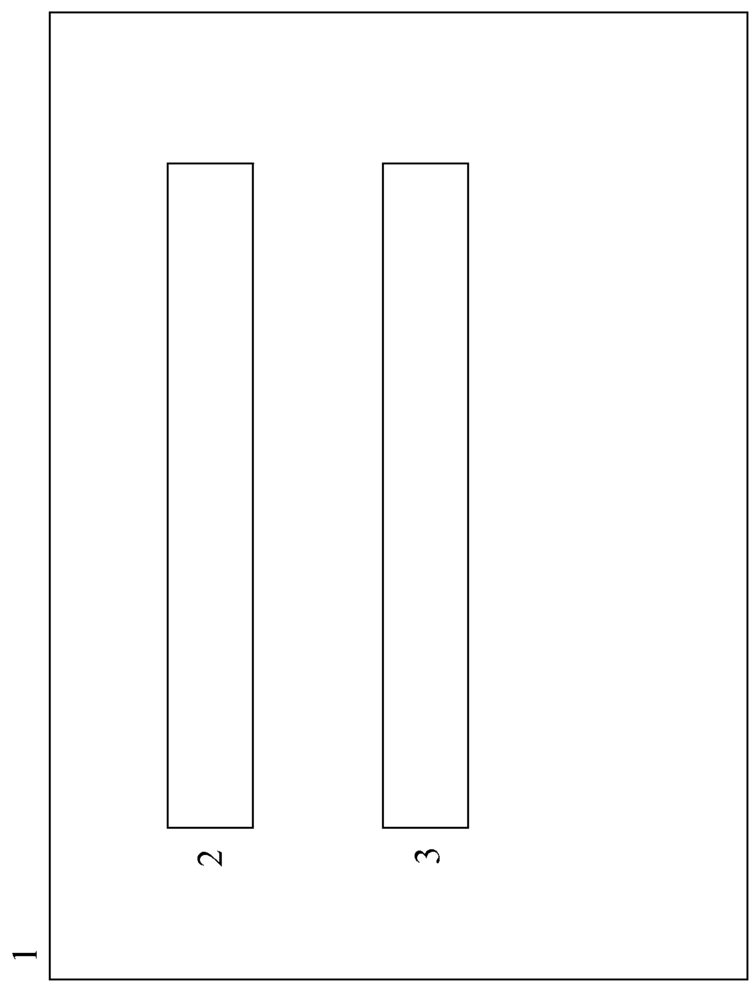
FIG. 1 is a schematic drawing for illustrating the structure and operation of the touch sensor mechanism of the present invention.

FIG. 1 is a schematic drawing for illustrating the structure and operation of the touch sensor mechanism of the present invention. As shown in FIG. 1, the touch sensor mechanism 1 of the present invention includes a cover lens 2 and a sensor device module 3. Herein, the touch sensor mechanism 1 can be applied in a touch display device, such as an out-cell LCD touch display device, in-cell LCD touch display device, on-cell LCD touch display device, in-cell/on-cell hybrid LCD touch display device, out-cell OLED touch display device, on-cell OLED touch display device, in-cell OLED touch display device, capacitive fingerprint recognition, capacitive palm print recognition, and handwriting trackpad depending on the real application request.

Regarding the cover lens 2, the cover lens 2 is a transparent material with a reduced thickness, a high dielectric constant (>4.5) and a high mechanic strength (>700 MPa) for touch. The finger's touching capacitance ($C_F$) can be greatly improved by reducing the thickness and increasing dielectric constant, and ratio ($C_F/C_P$) of the finger's touching capacitance ($C_F$) to the sensor parasitic capacitance of sensor device ($C_P$) of the sensor device module 3 is also greatly improved. Therefore, the signal-to-noise ratio (SNR) can be adjusted to a suitable value to prevent the sensitivity from too high or too low. The tolerance of crosstalk noise between sensors of the sensor device module 3 can be improved, and serious electromagnetic interaction due to the large-sized touch display device can be eliminated, and/or it provides more tolerance in circuit design.

Herein, sapphire ($Al_2O_3$) in varied axis (such as a-axis, c-axis, m-axis, and r-axis) is selected as the material of cover lens. The compression strength in each axis of sapphire is higher than 2000 MPa, and the dielectric constant ($\in_r$) is 11.5 in a-axis, 9.3 in c-axis and 11.5 in m-axis. Since sapphire in varied axis can be applied and sapphire can be a single crystal in one of a-axis, c-axis, m-axis, and r-axis. An aluminum oxynitride glass ($Al_{(64+x)/3}O_{(32-x)}N_x$, $2.75 \leq x \leq 5$) can also be selected as the material of cover lens, the aluminum oxynitride glass has a compression strength higher than 2677 MPa and the dielectric constant ($\in_r$) 9.19. And also a spinel or other transparent ceramic materials may be selected as the material of cover lens. The material is selected according to the real condition.

Reducing the thickness of cover lens and increasing the dielectric constant of cover lens, such that the finger's touching capacitance ($C_F$) can be greatly increased, and the signal-to-noise ratio (SNR) can be also improved. Take well-known out-cell touch device which has a cover lens with a thickness of 0.7 mm and a dielectric constant 4.5 as an example, if the cover lens is changed by a c-axis sapphire glass, the thickness could be reduced to 0.245 mm under touch in same compression strength, and the finger's touching capacitance $C_F$ becomes 5.9 times, and if the cover lens is changed by a a-axis or m-axis sapphire glass, the thickness could be reduced to 0.245 mm under touch in same compression strength, and the finger's touching capacitance $C_F$ becomes 7.3 times, moreover, if the cover lens is changed by an aluminum oxynitride glass, the thickness could be reduced to 0.183 mm under touch in same compression strength, and the finger's touching capacitance $C_F$ becomes 7.81 times.

Regarding the sensor device module 3, the sensor device module 3 has at least two sensor devices. In the view point of tolerance of crosstalk noise between any two sensor devices, it is hoped to have lower thickness of the cover lens 2 to reduce the capacitance transmitting distance, and higher dielectric constant of the cover lens 2, larger distance between sensor devices, and lower current for driving circuit to reduce the interaction of electromagnetic effect.

Moreover, the sensor device module 3 at least includes a first electrode layer of y-axis circuit net, an insulated layer and a second electrode layer of an x-axis circuit net in some embodiments, wherein the first electrode layer, the insulated layer and the second electrode layer consist of a sensor device. Each of the first electrode layer and the second electrode layer includes a transparent conductive film. The material of the transparent conductive film is 2D material, transparent conductive oxide (TCO) or conductive polymer. The 2D material is selected from a group consisting of graphene, silver nanowires, carbon nanotube, tungsten diselenide ($WSe_2$), molybdenum disulfide ($MoS_2$), and metal oxides. The transparent conductive oxide is selected from a group consisting of Al-doped ZnO (AZO), Ga-doped ZnO (GZO), In-doped ZnO (IZO), and Mg-doped ZnO (MZO). The conductive polymer is selected from a group consisting of polythiophene, polypyrrole, polyaniline, polyacetylene, polyphenylene, and poly(phenylene vinylene). In the other embodiments, sensor device module 3 is combined with the liquid crystal module and disposed in the liquid crystal module to form an in-cell type. The implement types are selected to satisfy the real application.

Figure 2:
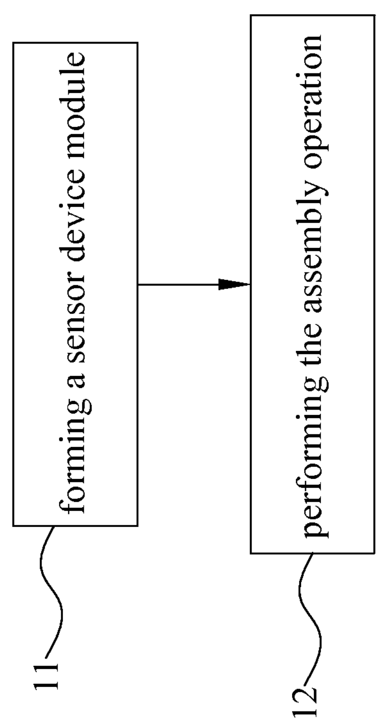
FIG. 2 is a flow chart illustrating the steps of the manufacturing method of touch sensor mechanism as the embodiment shown in of FIG. 1.

FIG. 2 is a flow chart illustrating the steps of the manufacturing method of touch sensor mechanism as the embodiment shown in of FIG. 1. As shown in FIG. 2, firstly, forming a sensor device module 3 in step 11, herein the steps 11 can be preparing a touch display device having the sensor device module 3 of the touch sensor mechanism 1 or forming the sensor device module 3 on the cover lens 2. The implement types are selected to satisfy the real application. Then, entering the step 12.

In the step 12, performing the assembly operation to manufacture the touch display device having touch function, wherein the step 12 can be covering the cover lens 2 of the touch sensor mechanism 1 on the top of touch display module to form a touch display device having the cover lens and having touch function after finishing the processes of the touch display module in sequence, or combining a structure having the cover lens 2 and the sensor device module 3 with the touch display module to form a touch display device having touch function. The implement types are selected to satisfy the real application.

Figure 3:
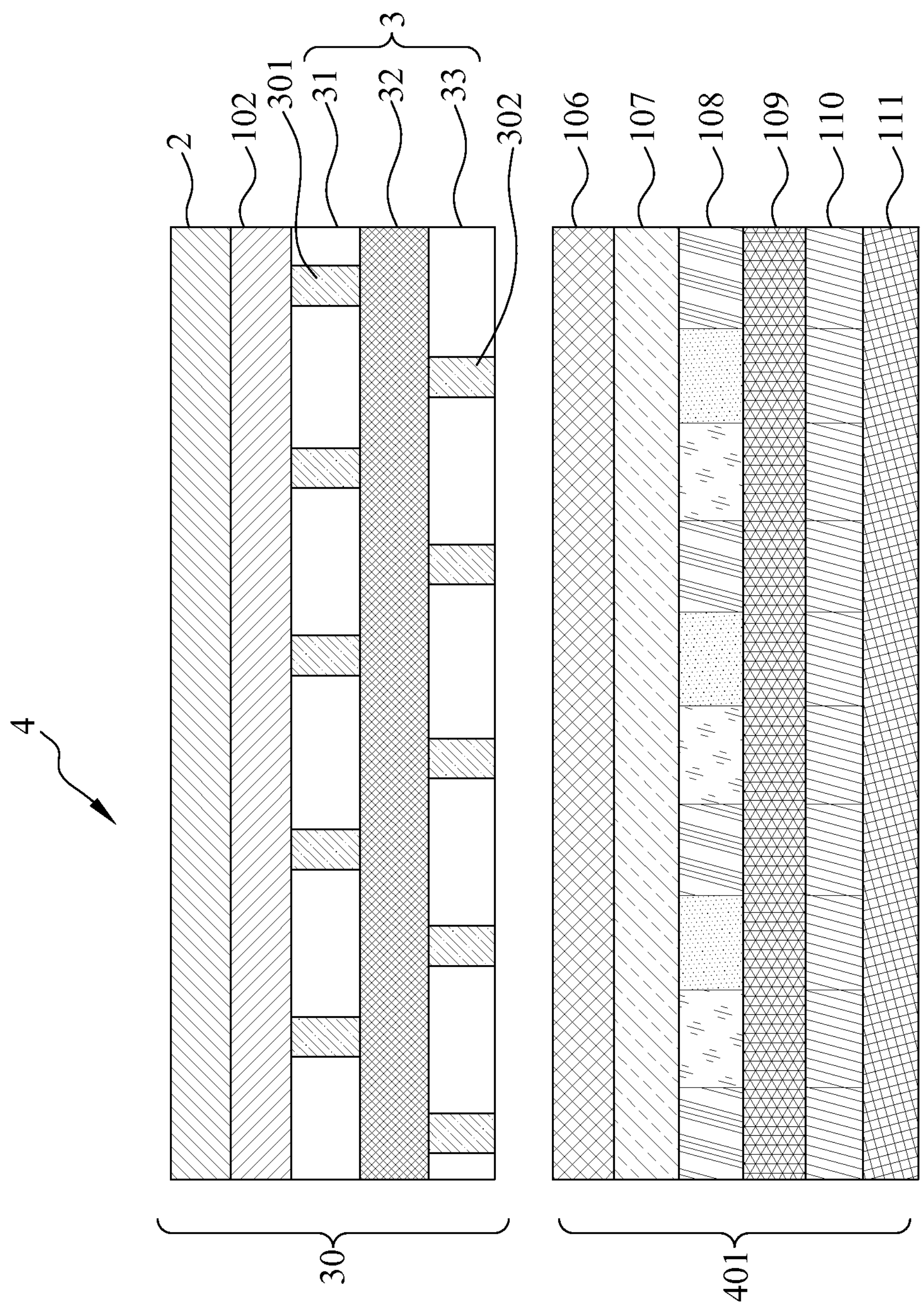
FIG. 3 is a schematic drawing illustrating the structure and operation of an embodiment of the touch sensor mechanism of the present invention.

FIG. 3 is a schematic drawing illustrating the structure and operation of an embodiment of the touch sensor mechanism of the present invention. As shown in FIG. 3, the touch sensor mechanism 1 of the present invention includes a cover lens 2 and a sensor device module 3. Herein, the touch sensor mechanism 1 can be applied in an out-cell LCD touch display device 4, wherein the out-cell LCD touch display device 4 includes the cover lens 2, a decoration 102, the sensor device module 3, a top polarizer 106, a color filter glass 107, a color filter module 108, a liquid crystal module 109, a thin film transistor (TFT) 110, and a thin film transistor array glass 111. The total thickness d of the cover lens 2, the decoration 102, and the sensor device module 3 is 0.7 mm. The top polarizer 106, the color filter glass 107, the color filter module 108, the liquid crystal module 109, the thin film transistor (TFT) 110, and the thin film transistor array glass 111 consist of the touch display module 401, and the cover lens 2, the decoration 102, and the sensor device module 3 consist of a structure 30.

Regarding the cover lens 2, the cover lens 2 is a transparent material with a reduced thickness, a high dielectric constant (>4.5) and a high mechanic strength (>700 MPa) for touch. The finger's touching capacitance ($C_F$) can be greatly improved by reducing the thickness and increasing dielectric constant, and ratio ($C_F/C_P$) of the finger's touching capacitance ($C_F$) to the sensor parasitic capacitance of sensor device ($C_P$) of the sensor device module 3 is also greatly improved. Therefore, the signal-to-noise ratio (SNR) can be adjusted to a suitable value to prevent the sensitivity too high or too low. Since the increasing of the finger's touching capacitance ($C_F$), the tolerance of crosstalk noise between sensors of the sensor device module 3 can be improved, and serious electromagnetic interaction due to the large-sized touch display device 4 can be eliminated, and/or it provides more tolerance in capacitance device design.

According to the prior art, the compression strength of general reinforced glass is 700 MPa, the dielectric constant $\in_r$ of the general reinforced glass is 4.5, and the thickness of the general reinforced glass is 0.7 mm. The signal-to-noise ratio (SNR) is $(\mu_U-\mu_P)/\sigma_U$, wherein $(\mu_U-\mu_P)$ is 135, $\sigma_U$ is 27, so the signal-to-noise ratio (SNR)=(135/27)=5. However, sapphire ($Al_2O_3$) in varied axis (such as a-axis, c-axis, m-axis, and r-axis) can be selected as the material of the cover lens 2 in this embodiment. Herein, for example, the material of cover lens 2 is sapphire in c-axis, the compression strength ≥2000 MPa, and the dielectric constant $\in_r$ is 9.3, under a condition of the same compression strength requirement with Chemically Strengthened Glass, the thickness can reduce to 0.35 d (0.245 mm). The signal-to-noise ratio (SNR) is $(\mu_U-\mu_P)/\sigma_U$, wherein $(\mu_U-\mu_P)=135\times(11.5/4.5)\times(0.7/0.245)=797$ and $\sigma_U=27$, such that the signal-to-noise ratio (SNR) is (797/27)=29.5, which is greatly than signal-to-noise ratio in prior art (SNR=5). For another example, the material of cover lens 2 is sapphire in a-axis, the compression strength ≥2000 MPa, and the dielectric constant $\in_r$ is 11.5, under a condition of the same compression strength requirement with Chemically Strengthened Glass, the thickness can reduce to 0.35 d. The signal-to-noise ratio (SNR) is $(\mu_U-\mu_P)/\sigma_U$, wherein $(\mu_U-\mu_P)=985.7$, and $\sigma_U=27$, such that the signal-to-noise ratio (SNR) is (985.7/27)=36.5, which is greatly than signal-to-noise ratio in prior art (SNR=5).

Since sapphire in varied axis can be applied, and sapphire can be a single crystal in one of a-axis, c-axis, m-axis, and r-axis, wherein the crystal direction in c-axis is (0001); crystal direction in a-axis includes $(1\bar{2}10)$, $(11\bar{2}0)$, $(2\bar{1}\bar{1}0)$, $(\bar{1}\bar{1}20)$, $(\bar{2}110)$ and $(\bar{1}21\bar{0})$; crystal direction in m-axis includes $(\bar{1}010)$, $(\bar{1}100)$, $(01\bar{1}0)$, $(10\bar{1}0)$, $(1\bar{1}00)$, and $(0\bar{1}10)$; and crystal direction in r-axis includes $(10\bar{1}1)$, $(\bar{1}01\bar{1})$, $(01\bar{1}\bar{1})$, $(0\bar{1}11)$, $(1\bar{1}0\bar{1})$ and $(\bar{1}101)$.

In addition, the material of cover lens can be an aluminum oxynitride glass ($Al_{(64+x)/3}O_{(32-x)}N_x$, $2.75\leq x\leq 5$) with compression strength higher than 2677 MPa and the dielectric constant ($\in_r$) 9.19, under a condition of the same compression strength requirement with Chemically Strengthened Glass, the thickness can reduce to 0.262 d (0.183 mm) In the other words, the signal-to-noise ratio (SNR) is $(\mu_U-\mu_P)/\sigma_U$, wherein $(\mu_U-\mu_P)$=1052.3, and $\sigma_U$=27, such that the signal-to-noise ratio (SNR) is (1052.3/27)=39, which is greatly than signal-to-noise ratio in prior art (SNR=5).

Regarding the sensor device module 3, the sensor device module 3 at least includes a first sensor layer 31 of y-axis sensor circuit net 301, an insulated layer 32 and a second sensor layer 33 of an x-axis sensor circuit net 302, such that the the sensor device module 3 includes at least two sensor device. Each of the first sensor layer 31 and the second sensor layer 32 includes a transparent conductive film. The material of the transparent conductive film is 2D material, transparent conductive oxide (TCO) or conductive polymer. The 2D material is selected from a group consisting of graphene, silver nanowires, carbon nanotube, tungsten diselenide ($WSe_2$), molybdenum disulfide ($MoS_2$), and metal oxides. The transparent conductive oxide is selected from a group consisting of Al-doped ZnO (AZO), Ga-doped ZnO (GZO), In-doped ZnO (IZO), and Mg-doped ZnO (MZO). The conductive polymer is selected from a group consisting of polythiophene, polypyrrole, polyaniline, polyacetylene, polyphenylene, and poly(phenylene vinylene). In the view point of tolerance of crosstalk noise between any two sensor devices, it is hoped to have lower thickness of the cover lens 2, higher dielectric constant of the cover lens 2, larger distance between sensor devices, and lower current for driving circuit.

Herein, even though the touch sensor mechanism 1 of this embodiment is applied in the out-cell LCD touch display device 4, however, the operation principle of the out-cell LCD touch display device and out-cell OLED touch display device is the same. So the device applied similar principle will be omitted.

Figure 4:
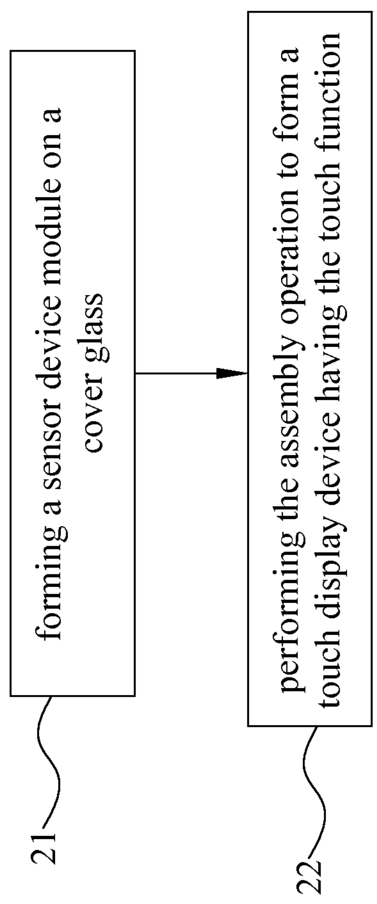
FIG. 4 is a flow chart illustrating the steps of the manufacturing method of touch sensor mechanism as the embodiment shown in of FIG. 3.

FIG. 4 is a flow chart illustrating the steps of the manufacturing method of touch sensor mechanism as the embodiment shown in of FIG. 3. As shown in FIG. 4, firstly, forming a sensor device module 3 in step 21, herein the step 21 is forming the sensor device module 3 on the cover lens 2. Then, entering the step 12.

In the step 12, performing the assembly operation to manufacture the touch display device having touch function, wherein the step 12 is combining a structure having the cover lens 2 and the sensor device module 3 with the touch display module 401 to form a touch display device having touch function.

Figure 5:
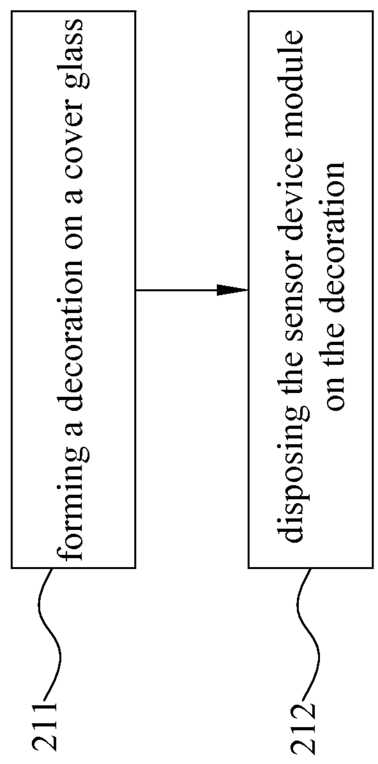
FIG. 5 is a flow chart illustrating the detail steps of preparing a touch display module having the sensor device module of the manufacturing method the touch sensor mechanism shown in FIG. 4.

FIG. 5 is a flow chart illustrating the detail steps of preparing a touch display module having the sensor device module of the manufacturing method the touch sensor mechanism shown in FIG. 4. As shown in FIG. 5, manufacturing a decoration 102 on the cover lens 2 in step 211, and then entering the step 212.

In step 212, disposing the touch sensor module 3 on the decoration 102.

Figure 6:
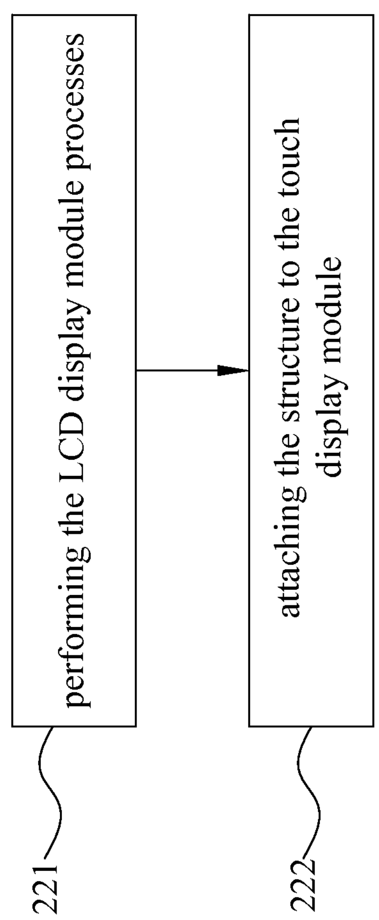
FIG. 6 is a flow chart illustrating the detail steps of covering a cover lens on the touch display module in the manufacturing method for the touch sensor mechanism shown in FIG. 4.

FIG. 6 is a flow chart illustrating the detail steps of covering a cover lens on the touch display module in the manufacturing method for the touch sensor mechanism shown in FIG. 4. As shown in FIG. 6, performing LCD display module processes in step 221 to form a touch display module 401 having a top polarizer 106, a color filter glass 107, a color filter module 108, a liquid crystal module 109, a thin film transistor 110, and a thin film transistor array glass 111, and then entering the step 222.

In step 222, attaching a structure 30 having the cover lens 2, the decoration 102 and the touch sensor module 3 to the touch display module 401.

Figure 7:
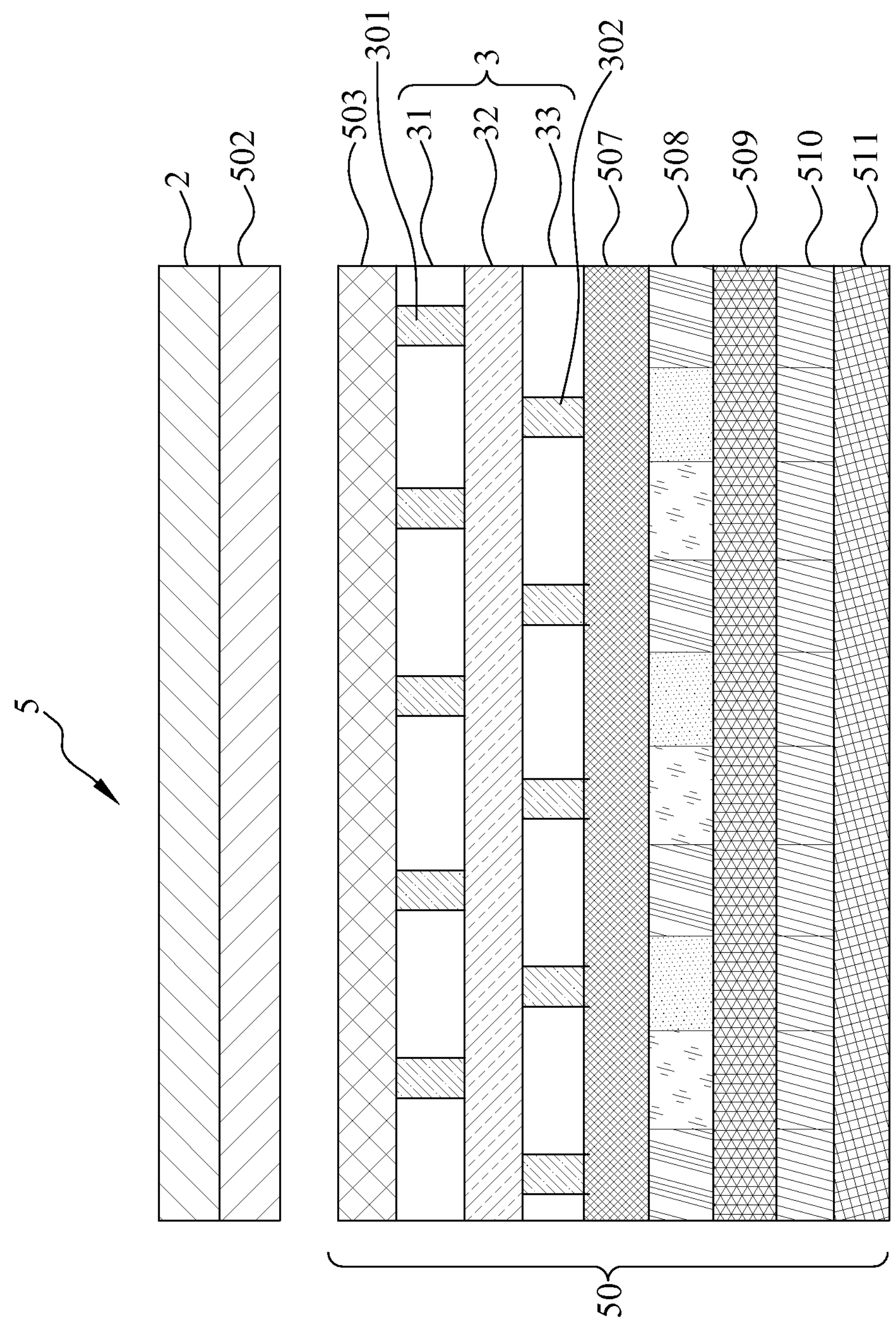
FIG. 7 is a schematic drawing illustrating the structure and operation of another embodiment of the touch sensor mechanism of the present invention.

FIG. 7 is a schematic drawing illustrating the structure and operation of another embodiment of the touch sensor mechanism of the present invention. As shown in FIG. 7, the touch sensor mechanism 1 of the present invention includes a cover lens 2 and a sensor device module 3. Herein, the touch sensor mechanism 1 can be applied in an on-cell LCD touch display device 5, wherein the on-cell LCD touch display device 5 includes the cover lens 2, a decoration 502, a top polarizer 503, the sensor device module 3, a color filter glass 507, a color filter module 508, a liquid crystal module 509, a thin film transistor 510, and a thin film transistor array glass 511, wherein the top polarizer 503, the sensor device module 3, the color filter glass 507, the color filter module 508, the liquid crystal module 509, the thin film transistor 510, and the thin film transistor array glass 511 consist of the touch display module 50.

Regarding the cover lens 2, the cover lens 2 is a transparent material with a reduced thickness, a high dielectric constant (>4.5) and a high mechanic strength (>700 MPa) for touch. The finger's touching capacitance ($C_F$) can be greatly improved by reducing the thickness and increasing dielectric constant, and ratio ($C_F/C_P$) of the finger's touching capacitance ($C_F$) to the sensor parasitic capacitance of sensor device ($C_P$) of the sensor device module 3 is also greatly improved. Therefore, the signal-to-noise ratio (SNR) can be adjusted to a suitable value to prevent the sensitivity too high or too low. Since the increasing of the finger's touching capacitance ($C_F$), the tolerance of crosstalk noise between sensors of the sensor device module 3 can be improved, and serious electromagnetic interaction due to the large-sized touch display device 5 can be eliminated, and/or it provides more tolerance in capacitance device design.

Herein, since the sensors of the sensor device module 3 is the same as the description of sensors in the out-cell LCD touch display device shown in FIG. 3, and the distance between the user's finger and the sensors is the thickness of the cover lens 2, so that the influence to the signal-to-noise ratio (SNR) is the same.

In the other words, sapphire ($Al_2O_3$) in varied axis (such as a-axis, c-axis, m-axis, and r-axis) can be selected as the material of the cover lens 2 in this embodiment. Herein, for example, the material of cover lens 2 is sapphire in c-axis, the compression strength ≥2000 MPa, and the dielectric constant $\sigma_r$ is 9.3, under a condition of the same compression strength requirement with Chemically Strengthened Glass, the thickness can reduce to 0.35 d. The signal-to-noise ratio (SNR) is $(\mu_U-\mu_P)/\sigma_U$, wherein $(\mu_U-\mu_P)=135\times(11.5/4.5)\times(0.7/0.245)=797$ and $\sigma_U$=27, such that the signal-to-noise ratio (SNR) is (797/27)=29.5, which is greatly than signal-to-noise ratio in prior art (SNR=5). For another example, the material of cover lens 2 is sapphire in a-axis, the compression strength ≥2000 MPa, and the dielectric constant $\in_r$ is 11.5, under a condition of the same compression strength requirement with Chemically Strengthened Glass, the thickness can reduce to 0.35 d. The signal-to-noise ratio (SNR) is $(\mu_U-\mu_P)/\sigma_U$, wherein $(\mu_U-\mu_P)$=985.7, and $\mu_U$=27, such that the signal-to-noise ratio (SNR) is (985.7/27)=36.5, which is greatly than signal-to-noise ratio in prior art (SNR=5).

Moreover, the material of cover lens can be an aluminum oxynitride glass ($Al_{(64+x)/3}O_{(32-x)}N_x$, 2.75≤x≤5) with compression strength higher than 2677 MPa and the dielectric constant ($\in_r$) 9.19, under a condition of the same compression strength requirement with Chemically Strengthened Glass, the thickness can reduce to 0.262 d (0.183 mm) In the other words, the signal-to-noise ratio (SNR) is $(\mu_U-\mu_P)/\sigma_U$, wherein $(\mu_U-\mu_P)$=1052.3, and $\sigma_U$=27, such that the signalto-noise ratio (SNR) is (1052.3/27)=39, which is greatly than signal-to-noise ratio in prior art (SNR=5).

In other cases, the material of cover lens can be a spinel or other transparent ceramic materials.

Regarding the sensor device module 3, the sensor device module 3 at least includes a first sensor layer 31 of y-axis sensor circuit net 301, an insulated layer 32 and a second sensor layer 33 of an x-axis sensor circuit net 302, such that the the sensor device module 3 includes at least two sensor device. Each of the first sensor layer 31 and the second sensor layer 32 includes a transparent conductive film. The material of the transparent conductive film is 2D material, transparent conductive oxide (TCO) or conductive polymer. The 2D material is selected from a group consisting of graphene, silver nanowires, carbon nanotube, tungsten diselenide ($WSe_2$), molybdenum disulfide ($MoS_2$), and metal oxides. The transparent conductive oxide is selected from a group consisting of Al-doped ZnO (AZO), Ga-doped ZnO (GZO), In-doped ZnO (IZO), and Mg-doped ZnO (MZO). The conductive polymer is selected from a group consisting of polythiophene, polypyrrole, polyaniline, polyacetylene, polyphenylene, and poly(phenylene vinylene). In the view point of tolerance of crosstalk noise between any two sensor devices, it is hoped to have lower thickness of the cover lens 2, higher dielectric constant of the cover lens 2, larger distance between sensor devices, and lower current for driving circuit.

Herein, even though the touch sensor mechanism 1 of this embodiment is applied in the on-cell LCD touch display device 5, however, the operation principle of the on-cell LCD touch display device and on-cell OLED touch display device is the same. So the device applied similar principle will be omitted.

Figure 8:
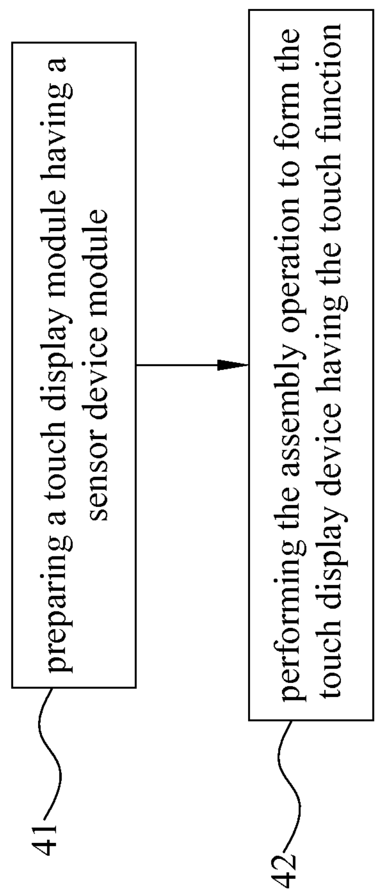
FIG. 8 is a flow chart illustrating the steps of the manufacturing method of touch sensor mechanism as the embodiment shown in of FIG. 7.

FIG. 8 is a flow chart illustrating the steps of the manufacturing method of touch sensor mechanism as the embodiment shown in of FIG. 7. As shown in FIG. 8, firstly, forming a sensor device module 3 in step 41, herein the step 41 is preparing a touch display device 50 having the sensor device module 3 of the touch sensor mechanism 1, and then, entering the step 42.

In the step 42, performing the assembly operation to manufacture the touch display device having touch function, wherein the step 42 is covering the cover lens 2 of the touch sensor mechanism 1 on the top of touch display module to form a touch display device 5 having the cover lens and having touch function after finishing the processes of the touch display module in sequence.

Figure 9:
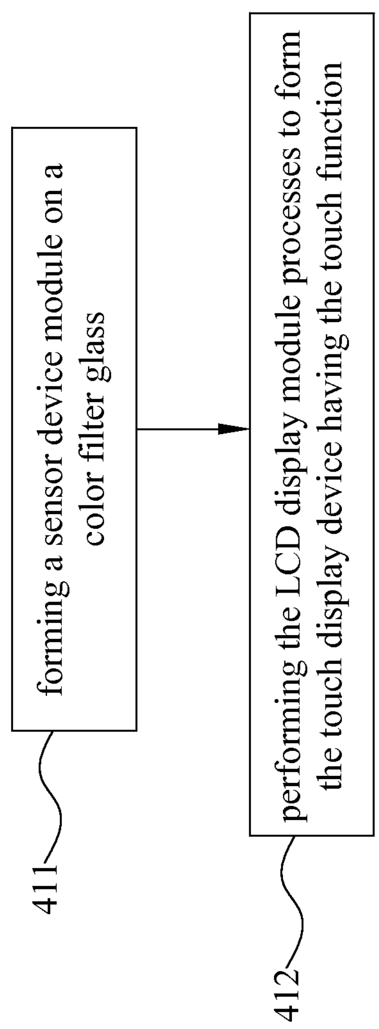
FIG. 9 is a flow chart illustrating the detail steps of preparing a touch display module having the sensor device module in the manufacturing method for the touch sensor mechanism shown in FIG. 8.

FIG. 9 is a flow chart illustrating the detail steps of preparing a touch display module having the sensor device module in the manufacturing method for the touch sensor mechanism shown in FIG. 8. As shown in FIG. 9, first disposing the sensor device module 3 on the color filter glass in step 411, and then entering the step 412.

In step 412, performing LCD display device processes of the touch display device 5 to make the touch display device 5 have touch display function.

Figure 10:
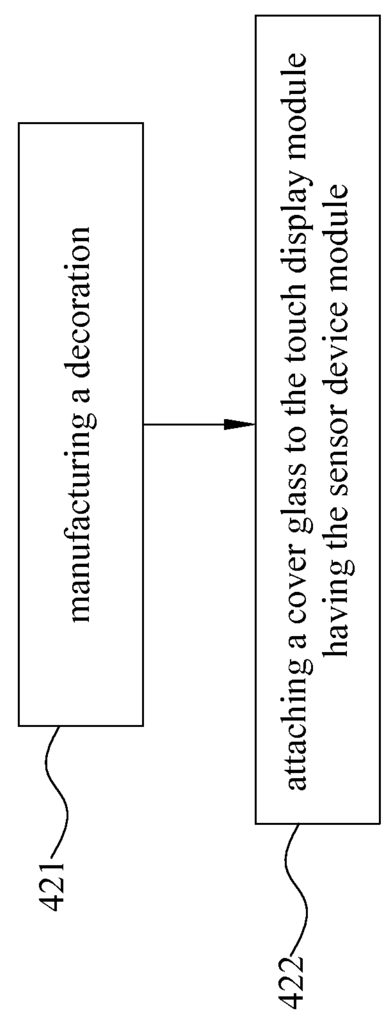
FIG. 10 is a flow chart illustrating the detail steps of covering a cover lens on the touch display module in the manufacturing method of the touch sensor mechanism shown in FIG. 8.

FIG. 10 is a flow chart illustrating the detail steps of covering a cover lens on the touch display module in the manufacturing method of the touch sensor mechanism shown in FIG. 8. As shown in FIG. 10, firstly, manufacturing a decoration 502 on the cover lens 2 in step 421, and then entering the step 422.

In step 422, attaching the cover lens 2 to the touch display module 50 having the touch sensor module 3.

Figure 11:
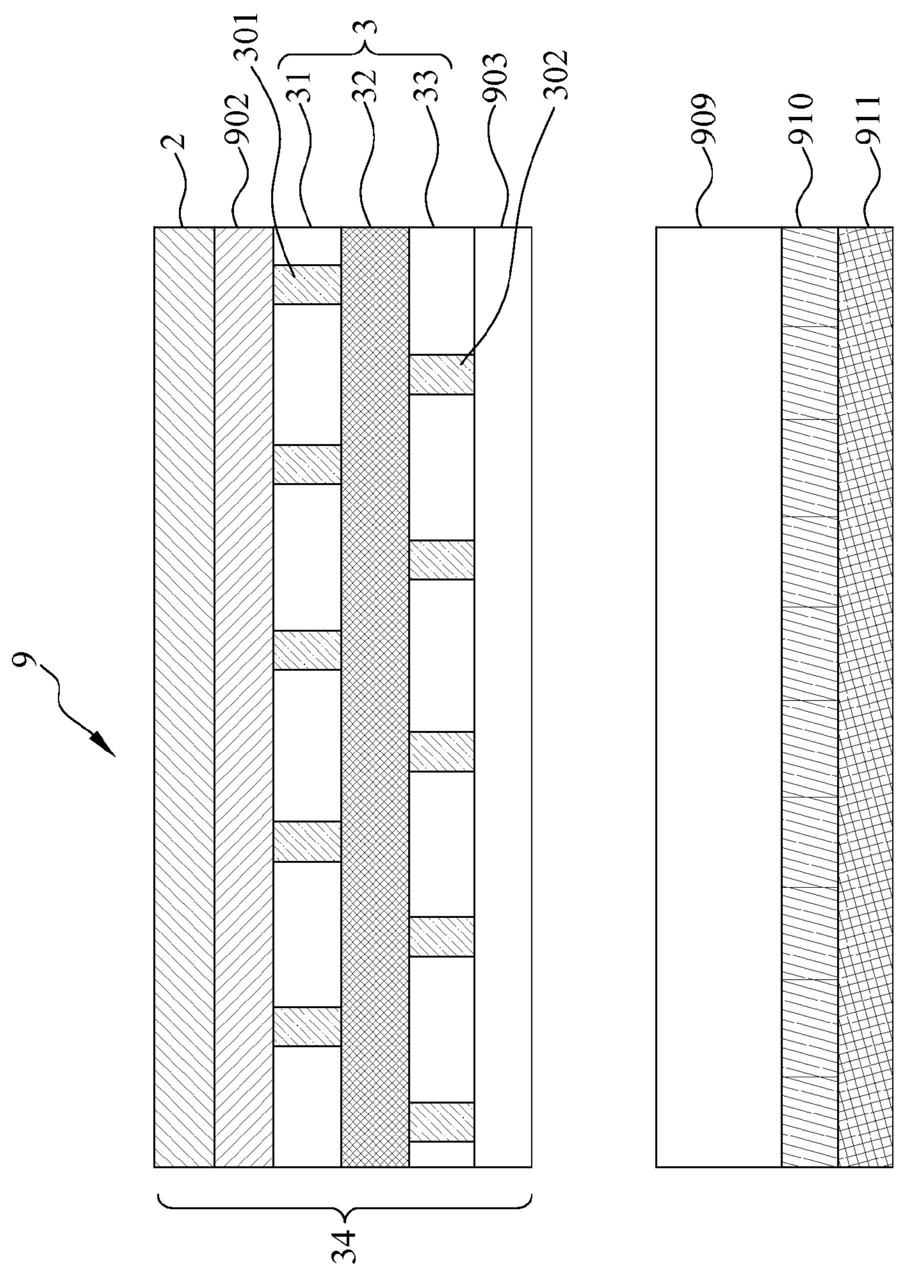
FIG. 11 is a schematic drawing illustrating the structure and operation of yet another embodiment of the touch sensor mechanism of the present invention.

FIG. 11 is a schematic drawing illustrating the structure and operation of yet another embodiment of the touch sensor mechanism of the present invention. As shown in FIG. 11, the touch sensor mechanism 1 of the present invention includes a cover lens 2 and a sensor device module 3. Herein, the touch sensor mechanism 1 can be applied in an on-cell P under OLED touch display device 9, wherein the on-cell P under OLED touch display device 9 includes the cover lens 2, a decoration 902, the sensor device module 3, a polarizer 903, an OLED module 909, an OLED switching thin film transistor 910, and a thin film transistor array glass 911, wherein a structure 34 is consisting of at least the cover lens 2, the decoration 902, and the sensor device module 3.

Regarding the cover lens 2, the cover lens 2 is a transparent material with high higher dielectric constant (>4.5) and high mechanic strength (>700 MPa) selected for touch. The finger's touching capacitance ($C_F$) is greatly improved by reducing the thickness and increasing the dielectric constant, such that ratio of the finger's touching capacitance ($C_F$) to the sensor parasitic capacitance of the sensor ($C_P$) (not visible) in the sensor device module 3, that is ($C_F/C_P$), is also improved. The signal-to-noise ratio (SNR) related to the ratio ($C_F/C_P$) can be adjusted to a suitable value to prevent the sensitivity too high or too low. The tolerance of crosstalk noise between sensor to sensor of the sensor device module 3 is improved due to the improvement of finger's touching capacitance ($C_F$), such that the electromagnetic affect due to the large-sized of touch panel of touch display device 9 is also eliminated, and/or it provides more tolerance in circuit design.

Herein, since the sensors of the sensor device module 3 is the same as the description of sensors in the out-cell LCD touch display device shown in FIG. 3, and the distance between the finger and the sensors is the thickness of the cover lens 2, so that the influence to the signal-to-noise ratio (SNR) is the same.

The OLED module 909 includes a transparent conductive film. The material of the transparent conductive film is 2D material, transparent conductive oxide (TCO) or conductive polymer. The 2D material is selected from a group consisting of graphene, silver nanowires, carbon nanotube, tungsten diselenide ($WSe_2$), molybdenum disulfide ($MoS_2$), and metal oxides. The transparent conductive oxide is selected from a group consisting of Al-doped ZnO (AZO), Ga-doped ZnO (GZO), In-doped ZnO (IZO), and Mg-doped ZnO (MZO). The conductive polymer is selected from a group consisting of polythiophene, polypyrrole, polyaniline, polyacetylene, polyphenylene, and poly(phenylene vinylene).

In this embodiment, even though the touch display device is an on-cell P-under OLED, however, the operation principle of on-cell P-under OLED and on-cell P-cap OLED is the same. So the device applied similar principle will be omitted.

Figure 12:
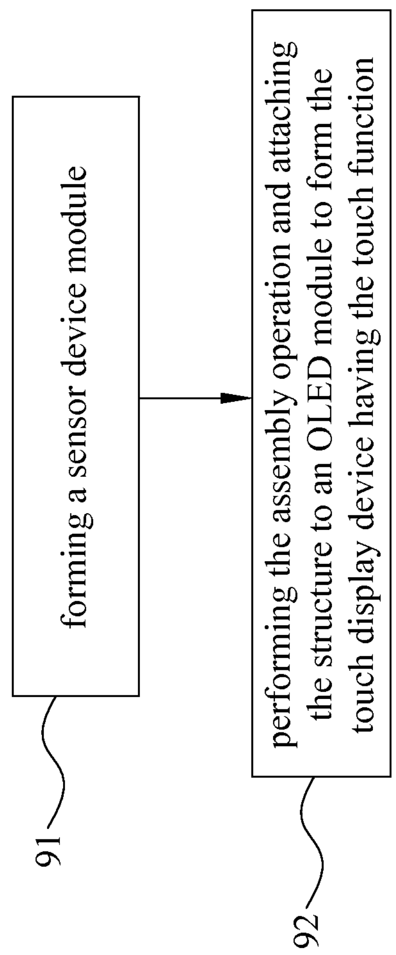
FIG. 12 is a flow chart illustrating the steps of the manufacturing method of the touch sensor mechanism as the embodiment shown in of FIG. 11.

FIG. 12 is a flow chart illustrating the steps of the manufacturing method of touch sensor mechanism as the embodiment shown in of FIG. 11.

In the step 92, performing the assembly operation to manufacture the touch display device 9 having touch function, wherein the step 92 at least includes combining the cover lens 2 and the structure 34 of the sensor device module 3 with the OLED module 909 to manufacture the touch display device 9 having the touch function.

Figure 13:
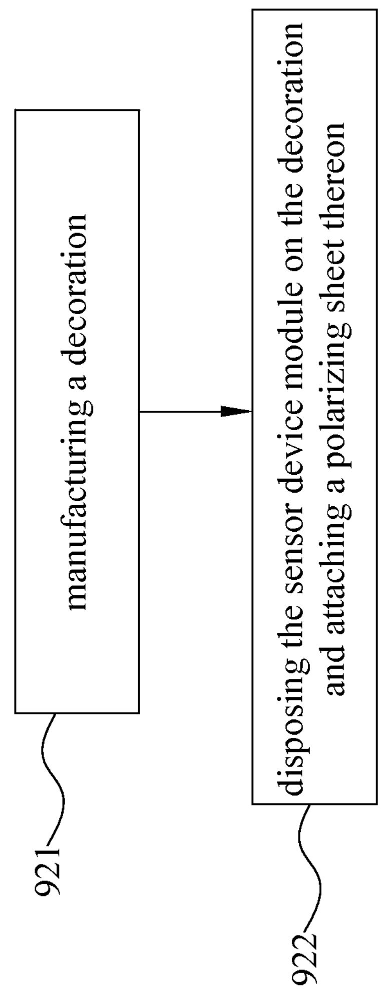
FIG. 13 is a flow chart illustrating the detail steps of forming sensor device module of the manufacturing method in the touch sensor mechanism shown in FIG. 12.

FIG. 13 is a flow chart illustrating the detail steps of forming the sensor device module of the manufacturing method the touch sensor mechanism shown in FIG. 12. As shown in FIG. 13, firstly perform a process for forming a decoration 902 in step 921, then entering the step 922.

In step 922, disposing the sensor device module 3 on the decoration 902, and attaching a polarizer 903 thereon.

FIG. 14 is a flow chart illustrating the detail steps of performing the assembly operation to manufacture the touch display device of the manufacturing method of the touch sensor mechanism shown in FIG. 12. As shown in FIG. 14, manufacturing OLED device in the step 931 firstly, then entering step 932.

In step 932, assembling and packaging the OLED device and the cover lens 2 of the sensor device module 3 together.

Figure 15:
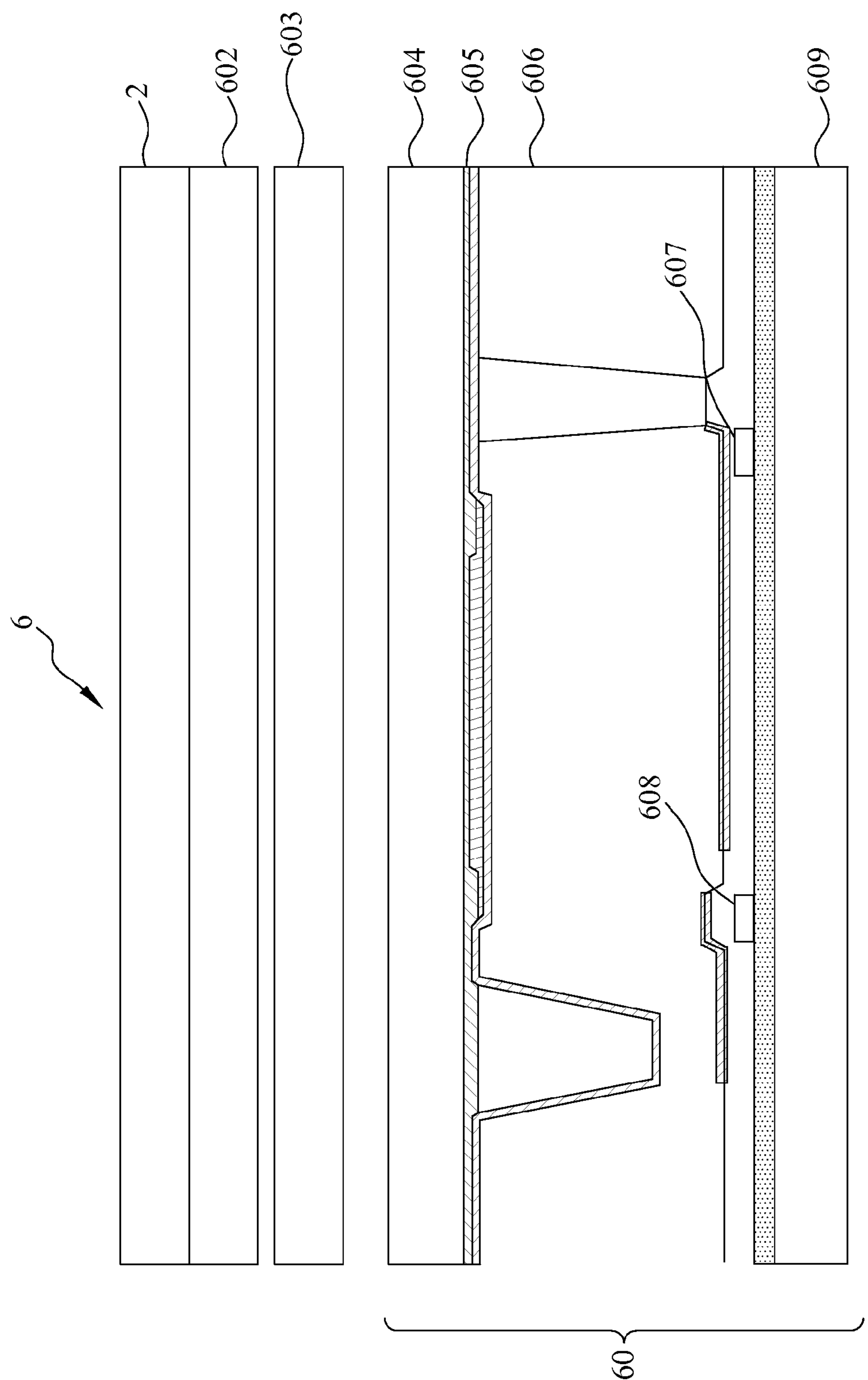
FIG. 15 is a schematic drawing illustrating the structure and operation of yet another embodiment of touch sensor mechanism of the present invention.

FIG. 15 is a schematic drawing for illustrating the structure and operation of yet another embodiment of touch sensor mechanism of the present invention. As shown in FIG. 15, the touch sensor mechanism 1 of the present invention includes a cover lens 2 and a sensor device module 3, wherein the touch sensor mechanism 1 is applied in an in-cell LCD touch display device 6. The in-cell LCD touch display device 6 includes the cover lens 2, a decoration 602, a top polarizer 603, the sensor device module 3, a color filter glass 604, a color filter 605, a liquid crystal module 606, a liquid switch thin film transistor 607, a capacitance sensing thin film transistor 608, and a thin film transistor glass 609, wherein the sensor device module 3 is disposed in the capacitance sensing thin film transistor 608 to form the in-cell type, and a touch display module 60 consists of the color filter glass 604, the color filter 605, the liquid crystal module 606, the liquid switch thin film transistor 607, the capacitance sensing thin film transistor 608, and the thin film transistor glass 609.

Regarding the cover lens 2, the cover lens 2 is a transparent material with a reduced thickness, a high dielectric constant (>4.5) and a high mechanic strength (>700 MPa) for touch. The finger's touching capacitance ($C_F$) can be greatly improved by reducing the thickness and increasing dielectric constant, and ratio ($C_F/C_P$) of the finger's touching capacitance ($C_F$) to the sensor parasitic capacitance of sensor device ($C_P$) of the sensor device module 3 is also greatly improved. Therefore, the signal-to-noise ratio (SNR) can be adjusted to a suitable value to prevent the sensitivity too high or too low. Since the increasing of the finger's touching capacitance ($C_F$), the tolerance of crosstalk noise between sensors of the sensor device module 3 to the thin film transistor (TFT) driver of liquid crystal display module 60 can be improved, and serious electromagnetic interaction due to the large-sized touch display device can be eliminated, and/or it provides more tolerance in circuit design.

According to the prior art, the compression strength of general reinforced glass is 700 MPa, the dielectric constant $\in_r$ of the general reinforced glass is 4.5, and the thickness of the general reinforced glass is 0.7 mm. The signal-to-noise ratio (SNR) is $(\mu_U-\mu_P)/\sigma_U$, wherein $(\mu_U-\mu_P)$ is 135, $\sigma_U$ is 27, so the signal-to-noise ratio (SNR)=(135/27)=5. However, sapphire ($Al_2O_3$) in varied axis (such as a-axis, c-axis, m-axis, and r-axis) can be selected as the material of the cover lens 2 in this embodiment.

Herein, for example, the material of cover lens 2 is sapphire in a-axis, the compression strength ≥2000 MPa, and the dielectric constant $\in_r$ is 11.5, under a condition of the same compression strength requirement with Chemically Strengthened Glass, the thickness can reduce to 0.245 mm. The signal-to-noise ratio (SNR) is $(\mu_U-\mu_P)/\sigma_U$, wherein $(\mu_U-\mu_P)=(135\times 7/12)+(135\times 5/12\times(11.5/4.5)\times(0.7/0.245))=489.46$, and $\sigma_U=27$, such that the signal-to-noise ratio (SNR) is (489.46/27)=18.13. The signal-to-noise ratio (SNR) is raised to 3.626 times (18.13/5=3.626) comparing with the signal-to-noise ratio of the prior art (SNR=5). If the thickness of the cover lens 2 is 0.3 under a same process yield condition, the $(\mu_U-\mu_P)=(135\times 7/12)+(135\times 5/12\times(11.5/4.5)\times(0.7/0.3))=414.15$, and $\sigma_U=27$, so that the signal-to-noise ratio (SNR) is $(\mu_U-\mu_P)/\sigma_U=(414.15/27)=15.34$. The signal-to-noise ratio (SNR) is raised to 3.068 times (15.34/5=3.068) comparing with the signal-to-noise ratio of the prior art (SNR=5). If the thickness of the cover lens 2 is 0.4 mm under a same process yield condition, the $(\mu_U-\mu_P)=(135\times 7/12)+(135\times 5/12\times(11.5/4.5)\times(0.7/0.4))=330.31$, and $\sigma_U=27$, so that the signal-to-noise ratio (SNR) is $(\mu_U-\mu_P)/\sigma_U=(330.31/27)=12.23$. The signal-to-noise ratio (SNR) is raised to 2.446 times comparing with the signal-to-noise ratio of the prior art (SNR=5). Therefore, it is obvious that the tolerance of the signal-to-noise is increased while reducing the thickness of the cover lens.

For another example, if the material of cover lens 2 is sapphire in c-axis, which has the compression strength ≥2000 MPa, and the dielectric constant $\in_r$ is 9.3, and a thickness 0.35 d (0.245 mm), the $(\mu_U-\mu_P)=(135\times 7/12)+(135\times 5/12\times(9.3/4.5)/(0.7/0.245))=410.89$, and $\sigma_U=27$, such that the signal-to-noise ratio (SNR) is $(\mu_U-\mu_P)/\sigma_U=(410.89/27)=15.22$. The signal-to-noise ratio (SNR) is raised to 3.044 (15.22/5=3.044) times comparing with the signal-to-noise ratio of the prior art (SNR=5).

For yet another example, if the cover lens 2 use aluminum oxynitride glass ($Al_{(64+x)/3}O_{(32-x)}N_x$, 2.75≤x≤5), which has the compression strength ≥2677 MPa, and the dielectric constant $\in_r$ is 9.19, and a thickness 0.262 d (0.1.83 mm), the $(\mu_U-\mu_P)=(135\times 7/12)+(135\times 5/12\times(9.3/4.5)/(0.7/0.183))=518.16$, and $\sigma_U=27$, such that the signal-to-noise ratio (SNR) is $(\mu_U-\mu_P)/\sigma_U=(518.16/27)=19.19$. The signal-to-noise ratio (SNR) is raised to 3.838 times comparing with the signal-to-noise ratio of prior art (SNR=5).

In other cases, the material of cover lens can be a spinel or other transparent ceramic materials.

Regarding the sensor device module 3, the sensor device module 3 has at least two sensor devices. In the view point of tolerance of crosstalk noise between any two sensor devices, it is hoped to have lower thickness of the cover lens 2, higher dielectric constant of the cover lens 2, larger distance between sensor devices, and lower current for driving circuit.

In this embodiment, the sensor device module 3 is disposed in the capacitance sensing thin film transistor 608 to form the in-cell type.

In this embodiment, even though the touch display device is an in-cell LCD, however, the operation principle of in-cell LCD and in-cell color conversion OLED is the same. So the device applied similar principle will be omitted.

Figure 16:
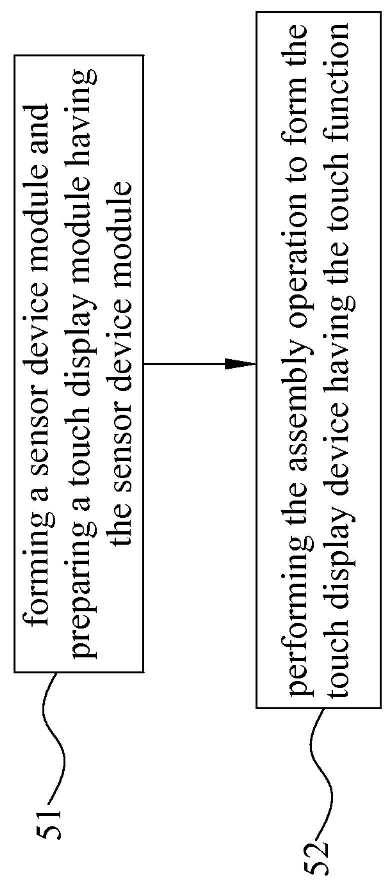
FIG. 16 is a flow chart illustrating the steps of the manufacturing method of touch sensor mechanism as the embodiment shown in of FIG. 15.

FIG. 16 is a flow chart illustrating the steps of the manufacturing method of touch sensor mechanism as the embodiment shown in of FIG. 15. As shown in FIG. 16, in step 51, forming a sensor device module 3 firstly, herein, a touch display module 60 is prepared to have the sensor device module 3 of a touch sensor mechanism 1; then entering the step 52.

In the step 52, performing the assembly operation to manufacture the touch display device 6 having touch function, wherein covering a cover lens 2 of the touch sensor mechanism 1 on the top of the touch display device 6 having the touch function after finishing the processes for manufacturing the touch display device 60, so that the touch display device 6 is covered by the cover lens 2 and has the touch function.

Figure 17:
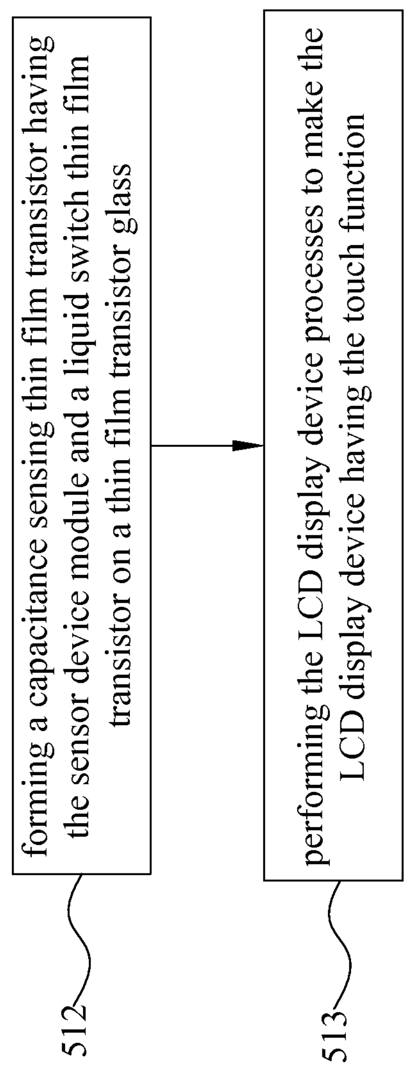
FIG. 17 is a flow chart illustrating the detail steps of forming a sensor device module of the manufacturing method of touch sensor mechanism shown in FIG. 16.

FIG. 17 is a flow chart illustrating the detail steps of forming a sensor device module of the manufacturing method of touch sensor mechanism shown in FIG. 16. As shown in FIG. 17, in step 512, firstly forming the capacitance sensing thin film transistor 608 having the sensor device module 3 and the liquid switch thin film transistor 607 on the thin film transistor glass 609, then enter into the step 513.

In the step 513, performing the sequence processes of LCD display device in order to form the LCD display device having the touch function.

Figure 18:
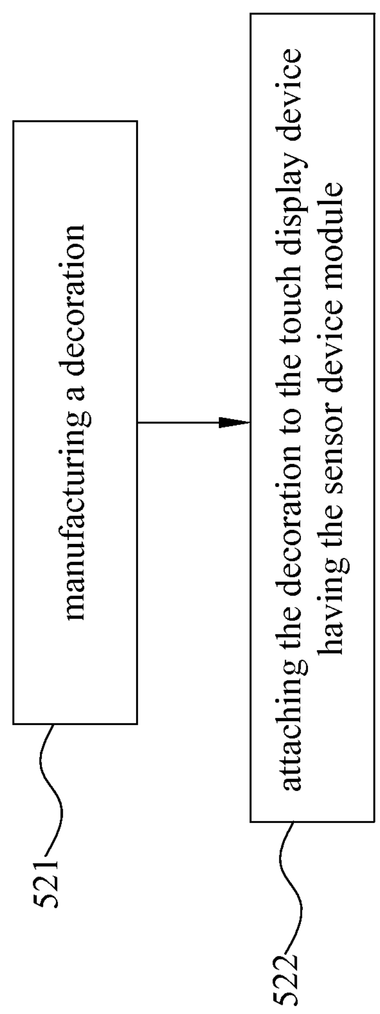
FIG. 18 is a flow chart illustrating the detail steps of performing the assembly operation to manufacture the touch display device of the manufacturing method the touch sensor mechanism.

FIG. 18 is a flow chart illustrating the detail steps of performing the assembly operation to manufacture the touch display device of the manufacturing method of the touch sensor mechanism shown in FIG. 16. As shown in FIG. 18, in step 521, firstly performing a process for forming a decoration 602, then enter into the step 522.

Figure 19:
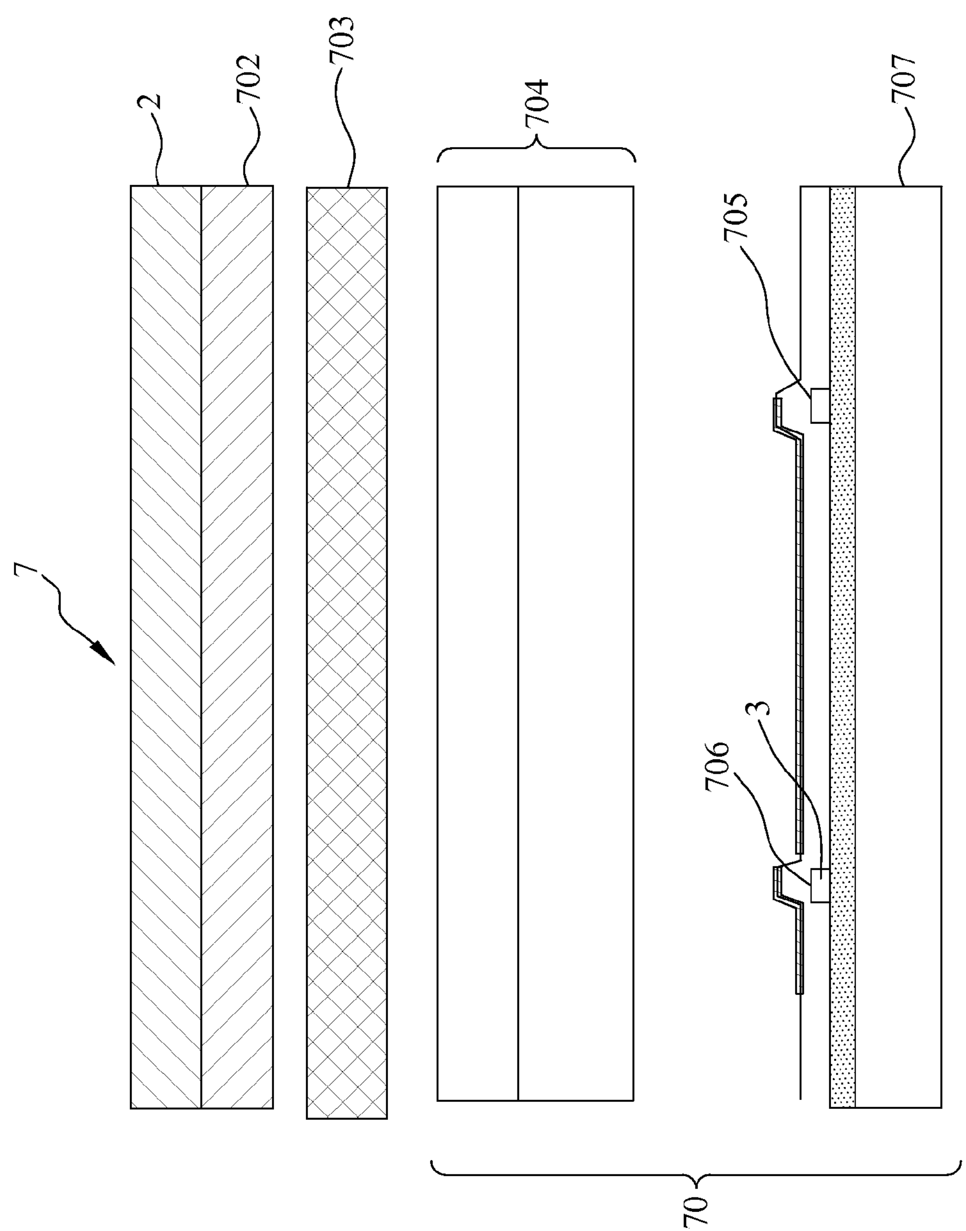
FIG. 19 is a schematic drawing for illustrating the structure and operation of further another embodiment of touch sensor mechanism of the present invention.

In step 522, attaching the decoration 602 with the touch display module 60 having sensor device module 3. FIG. 19 is a schematic drawing for illustrating the structure and operation of another embodiment of touch sensor mechanism of the present invention. As shown in FIG. 19, the touch sensor mechanism 1 of the present invention includes a cover lens 2 and a sensor device module 3, wherein the touch sensor mechanism 1 is applied in an in-cell OLED touch display device 7. The in-cell OLED touch display device 7 includes the cover lens 2, a decoration 702, a top polarizer 703, an OLED module 704, an OLED switch thin film transistor 705, the sensor device module 3, a capacitance sensing thin film transistor 706, and a glass substrate 707, wherein the sensor device module 3 is disposed in the capacitance sensing thin film transistor 706 to form the in-cell type.

Regarding the cover lens 2, the cover lens 2 is selected as a transparent material with a reduced thickness, a high dielectric constant (>4.5) and a high mechanic strength (>700 MPa) for touch. The finger's touching capacitance ($C_F$) is greatly improved by reducing the thickness and increasing dielectric constant, and ratio ($C_F/C_P$) of the finger's touching capacitance ($C_F$) to the sensor parasitic capacitance of sensor ($C_P$) of the sensor (not visible) of the sensor device module 3 is also greatly improved. Therefore, the signal-to-noise ratio (SNR) can be adjusted to a suitable value to prevent the sensitivity from too high or too low. Since the increasing of the finger's touching capacitance ($C_F$), the tolerance of crosstalk noise between sensors of the sensor device module 3 and switch TFT device of OLED display module can be improved, and serious electromagnetic interaction due to the large-sized touch panel of touch display device 6 can be eliminated and/or it provides more tolerance in circuit design.

In this embodiment, the sensor device module 3 is disposed in the capacitance sensing thin film transistor 706 to form the in-cell type.

The OLED module 704 includes a transparent conductive film. The material of the transparent conductive film is 2D material, transparent conductive oxide (TCO) or conductive polymer. The 2D material is selected from a group consisting of graphene, silver nanowires, carbon nanotube, tungsten diselenide ($WSe_2$), molybdenum disulfide ($MoS_2$), and metal oxides. The transparent conductive oxide is selected from a group consisting of Al-doped ZnO (AZO), Ga-doped ZnO (GZO), In-doped ZnO (IZO), and Mg-doped ZnO (MZO). The conductive polymer is selected from a group consisting of polythiophene, polypyrrole, polyaniline, polyacetylene, polyphenylene, and poly(phenylene vinylene).

Figure 20:
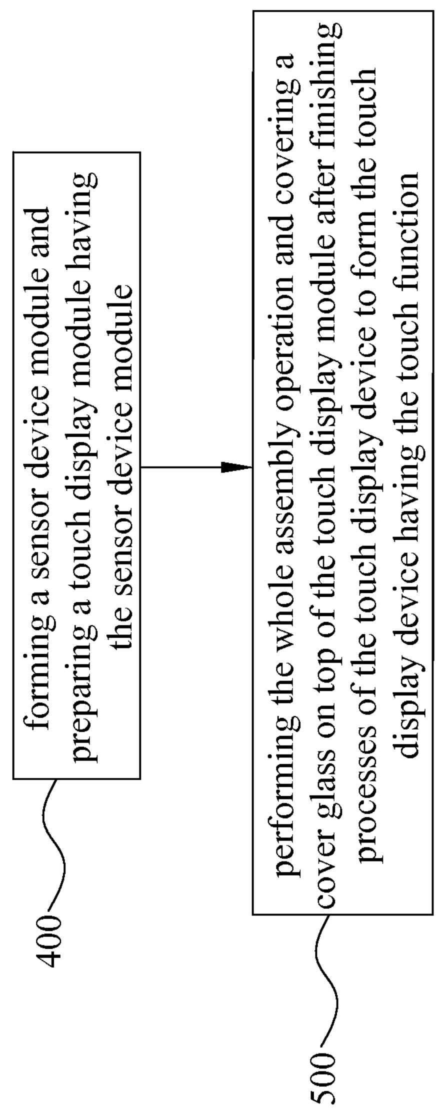
FIG. 20 is a flow chart illustrating the steps of the manufacturing method of touch sensor mechanism as the embodiment shown in of FIG. 19.

FIG. 20 is a flow chart illustrating the steps of the manufacturing method of touch sensor mechanism as the embodiment shown in of FIG. 19. As shown in FIG. 20, in step 400, forming a sensor device module 3 firstly, herein, a touch display module 60 is prepared to have the sensor device module 3 of a touch sensor mechanism 1; then enter into the step 500.

In the step 500, performing the assembly operation to manufacture the touch display device 6 having touch function, wherein a cover lens 2 of the touch sensor mechanism 1 is disposed on and cover the top of the touch display device 7 having the touch function after finishing the processes for manufacturing the touch display device, so that the touch display device 7 is covered by the cover lens 2 and has the touch function.

Figure 21:
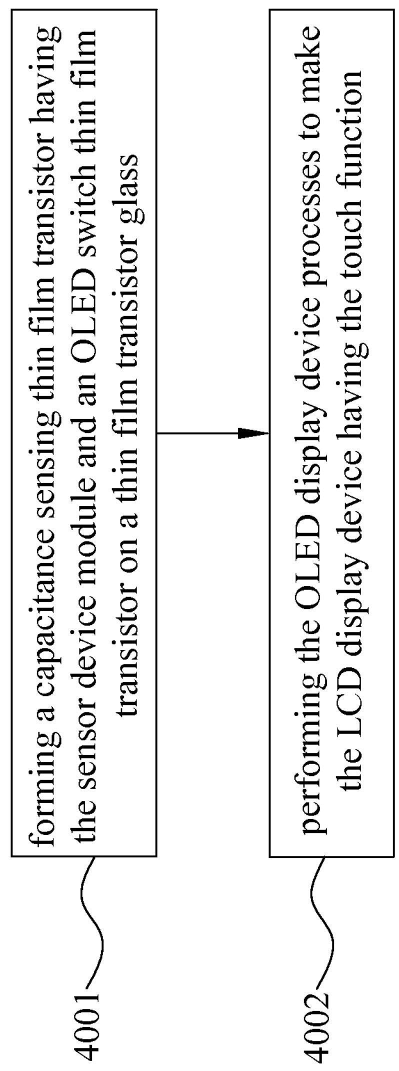
FIG. 21 is a flow chart illustrating the detail steps of forming a sensor device module of the manufacturing method of touch sensor mechanism shown in FIG. 20.

FIG. 21 is a flow chart illustrating the detail steps of forming a sensor device module of the manufacturing method of touch sensor mechanism shown in FIG. 20. As shown in FIG. 21, in step 4001, firstly performing the capacitance sensing thin film transistor 706 having the sensor device module 3 and the OLED switch thin film transistor 705 on the glass substrate 707, then enter into the step 4002.

In step 4002, performing the sequence processes of OLED display device 7 to form the OLED display device having the touch function.

Figure 22:
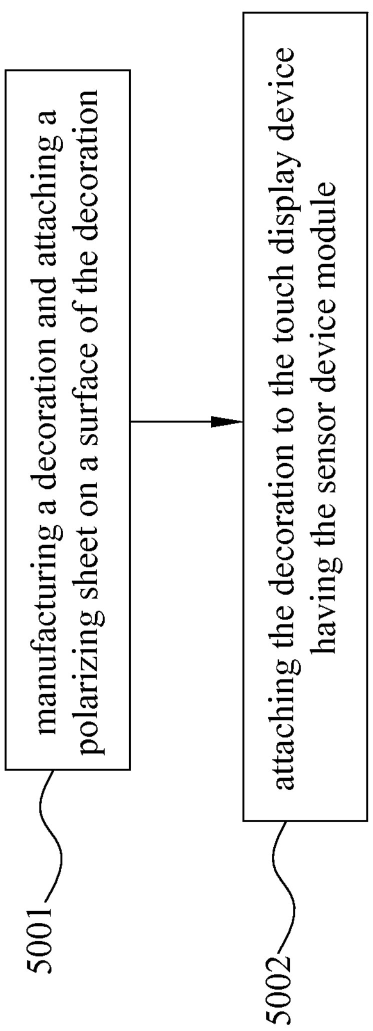
FIG. 22 is a flow chart illustrating the detail steps of performing the assembly operation to manufacture the touch display device of the manufacturing method the touch sensor mechanism shown in FIG. 20.

FIG. 22 is a flow chart illustrating the detail steps of performing the assembly operation to manufacture the touch display device of the manufacturing method of the touch sensor mechanism shown in FIG. 20. As shown in FIG. 22, in step 5001, firstly performing a process for forming a decoration 702 and disposing a polarizer on a surface of the decoration 702, then enter into the step 5002.

In step 5002, attaching the decoration 602 with the touch display module 70 having sensor device module 3.

According to the embodiments described above, the advantages of using the sapphire, the aluminum oxynitride glass, the spinel or other transparent ceramic materials with high compression strength and high dielectric constant are: 1. the thickness of the cover lens can be greatly reduced under the same compression strength; 2. for the out-cell type design, the signal-to-noise ratio SNR is raised to several times due to the synergy effect of the reduced thickness and high dielectric constant, and it provides more tolerance for designing the capacitance sensing device design; 3. for the on-cell type design, the signal-to-noise ratio SNR is raised to several times due to the synergy effect of the reduced thickness and high dielectric constant, and it provides more tolerance for designing the capacitance sensing device design; 4. for the in-cell type design, if it is used for LCD, the signal-to-noise ratio SNR is not raised as high as the out-cell type and the on-cell type due to the gap of color filter glass, and if it is used for OLED, the raising effect of signal-to-noise ratio SNR is as high as the out-cell type and the on-cell type due to color filter glass is not necessary in the OLED device; 5. the sensing area can be reduced, the distance between sensors can be increased and the level of noise can be reduced due to the synergy effect of the reduced thickness and high dielectric constant under the same signal to noise SNR.

According to the embodiments described above, a touch sensor mechanism and the manufacturing method thereof applied in a touch display device can be obtained. A transparent material with high dielectric constant (>4.5) and high mechanic strength (>700 MPa) is selected to serve as the cover lens for touch, such that the thickness is reduced, the dielectric constant is increased, and finger's touching capacitance ($C_F$) is improved. Moreover, the ratio ($C_F/C_P$) of the finger's touching capacitance ($C_F$) to the sensor parasitic capacitance of sensor ($C_P$) of the sensor (not visible) of the sensor device module is also greatly improved and the signal-to-noise ratio (SNR) related to the ratio ($C_F/C_P$) can be adjusted to a suitable value to prevent the sensitivity too high or too low. The tolerance of crosstalk noise between sensor to sensor can be improved because of the improved of the signal-to-noise ratio (SNR), such that serious electromagnetic interaction due to the large-sized touch panel of touch display device and centralization of touch device can be also eliminated, and/or it provides more tolerance in circuit design.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A touch sensor mechanism for a touch display device, comprising:

a cover lens made by a transparent material having a dielectric constant greater than 4.5 and a compression strength greater than 700 MPa for generating a finger's touching capacitance ($C_F$) while a user's finger of a user touches thereon; and a sensor device module including a plurality of sensor devices having a sensor parasitic capacitance ($C_P$);

wherein the cover lens and the sensor device module are disposed in the touch display device in such a manner that a ratio of a standard deviation value ($\sigma_U$) of the finger's touching capacitance ($C_F$) of the cover lens to the sensor parasitic capacitance ($C_P$) of the sensor device module is a signal-to-noise ratio (SNR), the signal-to-noise ratio (SNR) is adjusted along with the finger's touching capacitance ($C_F$) by reducing thickness of the cover lens.

2. The touch sensor mechanism as claimed in claim 1, wherein the touch display device is selected from a group consisting of an out-cell LCD touch display device, an in-cell LCD touch display device, on-cell LCD touch display device, in-cell/on-cell hybrid LCD touch display device, out-cell OLED touch display device, on-cell OLED touch display device, in-cell OLED touch display device, capacitive fingerprint recognition, capacitive palm print recognition, and handwriting trackpad.

3. The touch sensor mechanism as claimed in claim 2, wherein the transparent material of the cover lens is a sapphire, an aluminum oxynitride glass, a spinel or other transparent ceramic materials.

4. The touch sensor mechanism as claimed in claim 3, wherein a composition of the aluminum oxynitride glass is $Al_{(64+x)/3}O_{(32-x)}N_x$, and $2.75 \leq x \leq 5$.

5. The touch sensor mechanism as claimed in claim 2, wherein the sensor device module includes a first electrode layer having a y-axis circuit, an insulated layer net and a second electrode layer having an x-axis circuit net and the first electrode layer is a sensing electrode, and the second electrode layer is a driving electrode.

6. The touch sensor mechanism as claimed in claim 5, wherein the OLED touch display device includes an OLED module, each of the first electrode layer, the second electrode layer, and the OLED module includes a transparent conductive film.

7. The touch sensor mechanism as claimed in claim 6, wherein the material of the transparent conductive film is 2D material, transparent conductive oxide or conductive polymer.

8. The touch sensor mechanism as claimed in claim 7, wherein the 2D material is selected from a group consisting of graphene, silver nanowires, carbon nanotube, tungsten diselenide, molybdenum disulfide, and metal oxides.

9. The touch sensor mechanism as claimed in claim 7, wherein the transparent conductive oxide is selected from a group consisting of Al-doped ZnO, Ga-doped ZnO, In-doped ZnO, and Mg-doped ZnO.

10. The touch sensor mechanism as claimed in claim 7, wherein the conductive polymer is selected from a group consisting of polythiophene, polypyrrole, polyaniline, polyacetylene, polyphenylene, and poly(phenylene vinylene).

11. A manufacturing method of a touch sensor mechanism for a touch display device, comprising the steps:

forming a sensor device module, wherein the sensor device module includes a plurality of sensor devices having a sensor parasitic capacitance ($C_P$); and performing an assembly operation, wherein forming the sensor device module is preparing a touch display device having the sensor device module including the plurality of sensor devices; and performing the assembly operation is covering a cover lens on the top of the touch display device, wherein the cover lens generates a finger's touching capacitance ($C_F$) while a user's finger of a user touches thereon; wherein the cover lens and the sensor device module are disposed in the touch display device in such a manner that a ratio of a standard deviation value ($\sigma_U$) of the finger's touching capacitance ($C_F$) of the cover lens to the sensor parasitic capacitance ($C_P$) of the sensor device module is a signal-to-noise ratio (SNR), the signal-to-noise ratio (SNR) is adjusted along with the finger's, touching capacitance ($C_F$) by reducing thickness of the cover lens.

12. The manufacturing method as claimed in claim 11, wherein the touch display device is selected from a group consisting of an out-cell LCD touch display device, an in-cell LCD touch display device, on-cell LCD touch display device, in-cell/on-cell hybrid LCD touch display device, out-cell OLED touch display device, on-cell OLED touch display device, in-cell OLED touch display device, capacitive fingerprint recognition, capacitive palm print recognition, and handwriting trackpad.

13. The manufacturing method as claimed in claim 12, wherein the touch display device is an out-cell LCD touch display device.

14. The manufacturing method as claimed in claim 12, wherein the OLED touch display device includes an OLED module, the OLED module includes a transparent conductive film.

15. The manufacturing method as claimed in claim 14, wherein the material of the transparent conductive film is 2D material, transparent conductive oxide or conductive polymer.

16. The touch sensor mechanism as claimed in claim 15, wherein the 2D material is selected from a group consisting of graphene, silver nanowires, carbon nanotube, tungsten diselenide, molybdenum disulfide, and metal oxides.

17. The touch sensor mechanism as claimed in claim 15, wherein the transparent conductive oxide is selected from a group consisting of Al-doped ZnO, Ga-doped ZnO, In-doped ZnO, and Mg-doped ZnO.

18. The manufacturing method as claimed in claim 15, wherein the conductive polymer is selected from a group consisting of polythiophene, polypyrrole, polyaniline, polyacetylene, polyphenylene, and poly(phenylene vinylene).

* * * * *